United States Patent Office 3,030,346
Patented Apr. 17, 1962

3,030,346
PRODUCTION OF BLOCK COPOLYMERS
Richard N. Cooper, Jr., Borger, Tex., assignor to Phillips Petroleum Company, a corporation of Delaware
No Drawing. Filed Mar. 18, 1960, Ser. No. 15,831
8 Claims. (Cl. 260—83.7)

This invention relates to a method for the production of block copolymers.

Block copolymers of selected conjugated dienes, such as 1,3-butadiene, with vinyl-substituted aromatic compounds, such as styrene, can be produced at temperatures in the range of 115 to 140° F. by charging initially both types of monomers, hydrocarbon diluent, and an organolithium initiator, such as n-butyllithium. While in some instances, particularly in small scale operations, it has been possible to obtain block copolymers having fairly long blocks of the vinyl-substituted aromatic compound, difficulties have frequently been encountered when such processes are carried out on a plant scale. For example, when an attempt is made to prepare butadiene/styrene block copolymers by initiating the polymerization at 115° F. and higher, a considerable proportion of the styrene is consumed in forming a random copolymer with the butadiene because of a temperature surge soon after starting the reaction. The styrene which remains forms much shorter polystyrene blocks than would otherwise be produced. The effect upon the polymer is reflected chiefly in the processing characteristics. The products are difficult to extrude, the extruded material is frequently rough, and there is much more of a tendency to shrink upon extrusion than with a block copolymer having longer polystyrene blocks.

The following are objects of my invention.

An object of my invention is to provide a new polymerization process. A further object of my invention is to provide block copolymers formed of a copolymer block and a homopolymer block. A further object of my invention is to provide block copolymers of butadiene and styrene containing a butadiene/styrene copolymer block and a polystyrene block, the polystyrene block being larger than that obtained by other processes.

Other objects and advantages will be apparent to one skilled in the art upon reading this disclosure.

According to my invention, block polymers of conjugated dienes selected from the group consisting of butadiene, isoprene, and 1,3-pentadiene (piperylene) with vinyl-substituted aromatic compounds are produced in the presence of a hydrocarbon diluent and an organolithium initiator by a process which comprises charging the monomers, hydrocarbon diluent, and organolithium compound initially and effecting the polymerization at two temperature levels, the first in the range from 70 to 100° F. during which time the butadiene and part of the vinyl-substituted aromatic compound are copolymerized, and the second in the range from 115 to 140° F. to polymerize the rest of the vinyl-substituted aromatic compound. When operating in this manner, the block copolymers have longer blocks of the vinyl-substituted aromatic compound than are obtained when the entire polymerization process is effected at the higher temperature level and the resulting products have much better processing characteristics than are otherwise obtained.

The conjugated dienes employed in this invention polymerize at very satisfactory rates at temperatures of 70 to 100° F. in the presence of an organolithium initiator whereas the vinyl-substituted aromatic compounds polymerize only very slowly in this temperature range. When operating in accordance with the present process, sufficient time is allowed at the lower temperature to polymerize at least 85%, preferably at least 90%, of the conjugated diene. The polymer produced in this first step of the process is a random copolymer block containing a minor amount of the vinyl-substituted aromatic compound. Upon increasing the temperature to 115° F. or higher as hereinbefore specified, the vinyl-substituted aromatic compound polymerizes forming homopolymer blocks.

Examples of vinyl-substituted aromatic compounds which can be advantageously utilized include styrene, 3-methylstyrene, 2,4-dimethylstyrene, 3 ethylstyrene, 4-methylstyrene, 1-vinylnaphthalene, 2-vinylnaphthalene, and the like.

The organolithium compound used as a catalyst in the process of this invention corresponds to the formula $R(Li)_x$, wherein R is a hydrocarbon radical selected from the group consisting of aliphatic, cycloaliphatic and aromatic radicals and X is an integer from 1 to 4, inclusive. The aliphatic and cycloaliphatic radicals can be saturated or contain olefinic unsaturation. The R in the formula has a valence equal to the integer, and preferably contains from 1 to 20, inclusive, carbon atoms, although it is within the scope of the invention to use higher molecular weight compounds. Examples of these compounds include methyllithium, isopropyllithium, n-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,5-dilithionaphthalene, 1,2-dilithio-1,2-diphenylethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,4,6-tetralithiocyclohexane, 1,2,3,5-tetralithio-4-hexylanthracene, 1,3-dilithio-4-cyclohexene, and the like.

The amount of organolithium initiator employed can vary over a broad range. In general, the amount of initiator used will be in the range from 0.3 to 100 milliequivalents of lithium per 100 parts by weight of total monomers charged and will preferably be in the range from 0.6 to 15 milliequivalents of lithium per 100 parts by weight of total monomers charged. When n-butyllithium is employed as the initiator for the production of an easily processable 40 to 60 Mooney rubber (ML–4 at 212° F.), the quantity of initiator required will generally be in the range from 2 to 2.4 millimoles per 100 parts of total monomers charged.

As hereinbefore mentioned, the process of this invention is carried out in the presence of a hydrocarbon diluent. Aromatic hydrocarbons, paraffins, and cycloparaffins are applicable. The preferred hydrocarbons of these types are those containing from 3 to 12, inclusive, carbon atoms. Examples of diluents which can be used include propane, isobutene, n-pentane, isooctane, n-dodecane, cyclopentane, cyclohexane, methylcyclohexane, benzene, toluene, xylene, and the like. Mixtures of two or more of these hydrocarbons can be used if desired.

The time required for each step of process will depend upon the temperature. It will generally be in the range from 6 to 20 hours for the first step and from 1 to 4 hours for the second step.

After the completion of the polymerization reaction, the total reaction mixture is then treated to inactivate the catalyst and recover the polymer product. While it is to be understood that any suitable treating method can be employed, one method for accomplishing the desired treatment comprises adding a catalyst-inactivating material such as water, an alcohol, e.g., ethyl alcohol or isopropyl alcohol, an organic or inorganic acid or the like. It is generally preferred to add only an amount of the catalyst-inactivating material which is sufficient to deactivate the catalyst without causing precipitation of the dissolved polymer. It has also been found to be advantageous to add an antioxidant, such as phenyl-beta-naphthylamine, to the polymer solution prior to precipitation of the polymer. After addition of the catalyst-inactivating material and the antioxidant, the polymer present in the solution can then be precipitated by the addition of an excess of a material such as ethyl alcohol or isopropyl alcohol. Deactivation of the catalyst and precipitation of the polymer can be accomplished in a single step. The precipitated polymer can then be recovered by filtration, decantation, or the like. In order to purify the polymer, the separated polymer can be redissolved in a solvent, such as those suitable for the polymerization, and again precipitated by the addition of an alcohol. Thereafter, the polymer is again recovered by a suitable separation means, as indicated hereinbefore, and dried. The solvent and alcohol can be separated, for example, by fractional distillation, and reused in the process. The antioxidant can be added to the reaction mixture prior to precipitation of the polymer, to the solution of redissolved polymer, or to the solvent in which the polymer is to be subsequently redissolved. Of course, antioxidants can also be added in the compounding step.

The following examples are given to illustrate a preferred method of operating according to my invention.

*Example I*

A block copolymer of 1,3-butadiene with styrene was prepared in accordance with the following recipe:

| | Parts by weight |
|---|---|
| Butadiene | 75 |
| Styrene | 25 |
| Toluene | 1000 |
| n-Butyllithium (2.27 mmoles) | 0.145 |

The butadiene, styrene, and toluene were charged at room temperature to an 80-gallon reactor provided with a stirrer. The temperature was then increased to 86° F. and the n-butyllithium in solution in n-pentane (0.145 gram/gram solvent) was introduced. The temperature was held at 86° F. for 9 hours while the butadiene polymerized at the rate of 8 percent per hour. This period was followed by a two-hour period during which time the batch temperature was increased to 122° F. During this two-hour period very little polymerization occurred. Polymerization proceeded at 122° F. at substantially the same rate as at 86° F. for 3 hours to polymerize the styrene, making a total reaction time of 14 hours beginning with polymerization of butadiene. The reaction was carried out in an atmosphere of nitrogen.

The polymer solution was pressured into a vessel containing 15 gallons of water. A 20 weight percent solution of an alkylated polyphenol (Sp. G. 0.97–0.99) antioxidant was added (AgeRite Superlite, R. T. Vanderbilt Company) using one part by weight per 100 parts rubber. The polymer solution was subjected to a mild acid wash using a volume of water equal to the volume of polymer solution, the water containing 0.25 part by weight of sulfuric acid per 100 parts rubber. The mixture was stirred and the water decanted. After two more water washes (no acid) using a volume of water equal to the volume of the polymer solution, the solvent was removed by vacuum steam stripping and the polymer was extrusion dried. Following is a summary of the polymerization conditions and the results obtained:

| | |
|---|---|
| Time at 86° F., hours | 9 |
| Conversion at end of 9 hours, percent | 70 |
| Time to increase temp. to 1220 F., hours | 2 |
| Time at 122° F., hours | 3 |
| Total polymerization time, hours | 14 |
| ML–4 at 212° F. | 49 |
| Gel, percent | 0 |
| Polystyrene by oxidative degradation, percent | 17.7 |
| Total bound styrene, percent | 23.1 |

The 17.7 percent polystyrene obtained by oxidation degradation represents the styrene in polystyrene blocks. The method is based upon the principle that polymer molecules containing ethylenic bonds, when dissolved in p-dichlorobenzene and toluene, can be broken into fragments by reaction with tert-butyl hydroperoxide catalyzed with osmium tetroxide. Saturated polymer molecules or molecular fragments such as polystyrene or the polystyrene units in block copolymers containing no ethylenic bonds remain unattacked. The small fragments (low molecular weight aldehydes) and the low molecular weight polystyrene fragments from the random copolymer block are soluble in ethyl alcohol whereas the unattacked high molecular weight polystyrene from the styrene homopolymer block is insoluble in ethyl alcohol. It is thus possible to effect a separation of the high molecular weight polystyrene which constitutes the homopolymer block of the block copolymer. Following is a general description of the method used for this determination.

Approximately 0.5 gram of the polymer prepared as hereinbefore described was cut into small pieces, weighed to within one milligram, and charged to a 125 ml. flask. Forty to fifty grams of p-dichlorobenzene was then charged to the flask and the contents were heated to 265° F. The temperature was maintained at this level until the polymer dissolved. The solution was then cooled to 175 to 195° F. and 8.4 ml. of a 71.3 percent by weight aqueous solution of tert-butyl hydroperoxide was added. One milliliter of 0.003 molar osmium tetroxide in toluene was then added to the flask contents and the resulting solution was heated to between 230 and 240° F. for 10 minutes. The solution was then cooled to between 120 and 140° F. after which 20 ml. of toluene was added and the solution was poured slowly into 250 ml. of ethyl alcohol containing a few drops of concentrated sulfuric acid. Polystyrene coagulated and was recovered, dried, and weighed to find percent polystyrene in the blocks.

As an example of the prior method of operation, a series of butadiene styrene block copolymers was prepared in an 80-gallon reactor using the recipe given above except that variable amounts of n-butyllithium were employed and the polymerizations were initiated at a higher temperature, which was maintained throughout the polymerization period, rather than using two temperature levels. All runs were effected in an atmosphere of nitrogen. The polymer from each run was recovered in the manner hereinbefore described except that 0.5 part by weight per 100 parts rubber of 2,2'-methylene-bis(4-methyl-6-tert-butylphenol) was used as the antioxidant (AO 2246) instead of AgeRite Superlite. Following is a summary of the runs:

| | 1 | 2 | 3 | 4 | 5 | 6 |
|---|---|---|---|---|---|---|
| n-Butyllithium, parts | 0.110 | 0.125 | 0.132 | 0.140 | 0.150 | 0.145 |
| n-Butyllithium, mmoles | 1.72 | 1.95 | 2.06 | 2.19 | 2.34 | 2.27 |
| Temperature range, ° F | 116–132 | 116–135 | 115–133 | 116–132 | 116–160 | 114–135 |
| Reaction time, hours | 4.0 | 4.5 | 5.8 | 5.0 | 3.3 | 5.0 |
| Conversion, percent | 100 | 100 | 100 | 100 | 100 | 100 |
| ML–4 at 212° F | 62 | 54 | 69 | 55 | 33 | 52 |

Products from the six foregoing runs were blended. Mooney value of the blend (ML-4 at 212° F.) was 58. Polystyrene was determined by oxidative degradation and was found to be 12.9 percent. The total bound styrene determined by ultraviolet analysis, was 22.0 percent.

These data show that when the block copolymers were prepared by initiating the polymerization at a lower temperature to polymerize the butadiene followed by completion of the reaction at a higher temperature to polymerize the styrene, longer polystyrene blocks are obtained than when polymerization is initiated at a higher temperature. Furthermore, the former method gives products which have much better processing characteristics.

*Example II*

Four block copolymers of butadiene with styrene were prepared using the first recipe and procedure described in the first part of Example I except that variable amounts of n-butyllithium were employed. Following is a summary of these runs:

|  | Run | | | |
|---|---|---|---|---|
|  | 1 | 2 | 3 | 4 |
| n-Butyllithium, parts | 0.145 | 0.145 | 0.139 | 0.145 |
| n-Butyllithium, mmoles | 2.27 | 2.27 | 2.17 | 2.27 |
| Time at 86° F., hrs | 6.5 | 8 | 8 | 8 |
| Conversion at end of time at 86° F., percent | 75 | 78 | 78 | 76 |
| Time to increase temperature to 122° F., hrs | 2.2 | .2 | 4 | 2.5 |
| Total polymerization time, hrs | 12.5 | 12.0 | 15 | 14 |
| ML-4 at 212° F | 44 | 36 | 51 | 44 |
| Polystyrene by oxidative degradation, percent | 16.1 | 16.5 | 17.4 | 17.9 |
| Bound styrene, percent | 24.3 | 23.8 | 24.0 | 24.2 |

These runs again demonstrate the consistently higher polystyrene in the block polymers than is obtained when the polymerization is initiated at a higher temperature and continued at a high level as shown in the series of runs in the second part of Example I.

*Example III*

The block copolymer of Example I (17.7 percent polystyrene) was evaluated in a clay loaded insulation compound. This was compared with the blend of polymers (12.9 percent polystyrene) prepared entirely at the higher temperature and a 78/28 butadiene/styrene random copolymer prepared by emulsion polymerization at 41° F. in a fatty acid emulsified recipe. The emulsion copolymer was a low ash rubber which had a bound styrene content of 23 percent and a Mooney value (ML-4 at 212° F.) of 52. The compounding recipe was as follows:

Parts by weight
Rubber _____ 100
Stearic acid _____ 2
Zinc oxide _____ 10
AgeRite powder [1] _____ 1.5
Dixie clay [2] _____ 100
Purecal M [3] _____ 50
Cumar MH 2½ [4] _____ 15
Sulfur _____ 2
Altax [5] _____ 1.25
Methyl zimate [6] _____ 0.5

[1] Phenyl-beta-naphthylamine.
[2] A hard-type, white-to-cream colored kaolin.
[3] Chemically precipitated calcium carbonate containing a minimum of 98.5% $CaCO_3$; particle size, 0.12-0.32 micron.
[4] Composition composed of polymers of indene, coumarone, and associated coal tar compounds; melting point 115-125° C.; ash (maximum) 0.5%; sp. gr. 15.5° C./15.5° C., 1.130.
[5] Benzothiazyl disulfide.
[6] Zinc dimethyldithiocarbamate.

The following data were obtained:

|  | 17.7% Polystyrene Block | 12.9% Polystyrene Block | Emulsion Random |
|---|---|---|---|
| Extrusion at 250° F.: | | | |
| Inches/min | 87.5 | 74 | 47 |
| Grams/min | 153 | 145.6 | 149 |
| Rating | 12 | 11— | 11+ |
| Mooney (ML-4 at 212° F.) | 44.0 | 50.5 | 34.0 |

These data show that the copolymer of this invention has outstanding extrusion characteristics. It extruded a greater number of inches, a greater number of grams and had a better rating. The physical properties of the copolymer of the invention were also very good. The extrusion tests were made with a No. ½ Royle Extruder with Garvey die. See Ind. Eng. Chem., 34, 1309 (1942).

*Example IV*

The copolymers used in Example III were evaluated in a black loaded flexible cord jacket compound. The following recipe was used.

Parts by weight
Rubber _____ 100
Reogen [1] _____ 5
Stearic acid _____ 1.5
Zinc oxide _____ 5
AgeRite Resin D [2] _____ 2
AgeRite White [3] _____ 0.5
Sunproof Super [4] _____ 2
P-33 [5] _____ 40
Philblack E [6] _____ 40
Mineral Rubber (MR 38) [7] _____ 30
Sulfur _____ 2.25
Altax [8] _____ 1
Bismate [9] _____ 1

[1] Mixture of 80% mineral oil, 15% sulfonated petroleum product, and 5% n-butyl alcohol.
[2] Polymerized trimethyldihydroquinoline.
[3] Symmetrical di-beta-naphthyl-p-phenylenediamine.
[4] Blend of waxes, M.P. 160-167° F., Sp. G. 0.93.
[5] Fine thermal carbon black.
[6] Super abrasion furnace black.
[7] An extending plasticizer for rubber, consisting of a slightly elastic, black, glossy, solid bituminous petroleum product that is readily friable, showing a conchoidal fracture; melting point 300-320° F.
[8] As in Example III.
[9] Bismuthous dimethyl dithiocarbamate.

The following data were obtained:

|  | 17.7% Polystyrene Block | 12.9% Polystyrene Block | Emulsion Random |
|---|---|---|---|
| Watt-hours | 250 | 260 | 340 |
| Mooney (ML-4 at 212° F.) | 36.5 | 44.0 | 32.0 |
| Extrusion: | | | |
| Inches/min | 92.5 | 80 | 38.6 |
| Grams/min | 132 | 121.5 | 109 |
| Rating | 12 | 12 | 12— |

The copolymer of my invention required approximately the amount of power in mixing as the control containing 12.9 percent block polystyrene and far less than the emulsion copolymer. It also was outstanding in extrusion results both in inches per minute and grams per minute when compared to the other two copolymers.

*Example V*

The block copolymer of Example I (17.7 percent polystyrene) was evaluated in premium and standard shoe sole recipes. A butadiene/styrene random copolymer prepared by emulsion polymerization at 41° F. was evaluated in similar recipes for comparative purposes. This rubber had a Mooney value (ML-4 at 212° F.) of 52 and a bound styrene content of 21 percent. Compounding recipes were as follows:

|  | Premium | | Standard | |
|---|---|---|---|---|
|  | Block Copolymer | Random Copolymer | Block Copolymer | Random Copolymer |
| Block Copolymer | 100 |  | 100 |  |
| Random Copolymer |  | 70 |  | 80 |
| Pliolite S-6B [1] |  | 30 |  | 20 |
| Reogen [2] | 2 | 2.5 | 2.5 | 2.5 |
| Stearic Acid | 1.5 | 1.5 | 1.5 | 1.5 |
| Zinc oxide | 3 | 3 | 3 | 3 |
| AgeRite Stalite [3] | 1 | 1 | 1 | 1 |
| Cumar MH 2½ [4] | 7 | 10 | 10 | 10 |
| Medium process oil | 2.5 | 2.5 | 2.5 | 2.5 |
| Paraffin | 1 | 1 | 1 | 1 |
| Cotton flock | 4 | 4 | 4 | 4 |
| Dixie clay [4] | 10 | 90 | 90 | 90 |
| Hi-Sil 233 [5] | 50 |  |  |  |
| Silene EF [6] |  | 40 | 40 | 40 |
| Sulfur | 2 | 2.1 | 2.1 | 2.1 |
| Triethanolamine | 1 |  |  |  |
| Altax [4] | 1.25 | 1.6 | 1.6 | 1.6 |
| Methyl Zimate [4] | 0.6 | 0.4 | 0.4 | 0.4 |

[1] An 85/15 styrene/butadiene copolymer.
[2] As in Example IV.
[3] Mixture of mono- and dioctyl diphenylamine (Sp.G. 0.97).
[4] As in Example III.
[5] Hydrated silica pigment of extremely fine particle size.
[6] Hydrated calcium silicate.

The following results, after curing 15 minutes at 320° F., show the superiority in abrasion resistance (ASTM D394–47) of the block copolymer stocks:

|  | Premium | | Standard | |
|---|---|---|---|---|
|  | Block Copolymer | Random Copolymer | Block Copolymer | Random Copolymer |
| Abrasion resistance rev./mil | 3.07 | 1.48 | 1.89 | 0.88 |

As many possible embodiments can be made of this invention without departing from the scope thereof, it is to be understood that all matter herein set forth is to be interpreted as illustrative and not as unduly limiting the invention.

I claim:

1. In the preparation of a block copolymer formed of a copolymer block and a homopolymer block by polymerizing a mixture of (1) a conjugated diene selected from the group consisting of 1,3-butadiene, isoprene, and piperylene, and (2) a vinyl-substituted aromatic hydrocarbon in which said vinyl group is attached to a nuclear carbon atom with a compound of the formula $R(Li)_x$, wherein R is a hydrocarbon radical selected from the group consisting of aliphatic, cycloaliphatic, and aromatic radicals and X is an integer from 1 to 4, inclusive, in the presence of a hydrocarbon diluent, the improvement comprising effecting the polymerization at a temperature in the range of 70 to 100° F. for a period of time sufficient to polymerize at least 85 percent of the conjugated diene and no more than a part of the vinyl-substituted aromatic hydrocarbon and, subsequently, at a temperature in the range of 115 to 140° F. for a second period of time sufficient to polymerize substantially all of the remaining monomers.

2. The method of claim 1 wherein said diene is 1,3-butadiene and said vinyl-substituted aromatic compound is styrene.

3. The method of claim 1 wherein said diene is isoprene and said vinyl-substituted aromatic compound is styrene.

4. The method of claim 1 wherein said compound of the formula $R(Li)_x$ is n-butyllithium.

5. The method of claim 1 wherein said compound of the formula $R(Li)_x$ is isopropyllithium.

6. The method of claim 1 wherein said compound of the formula $R(Li)_x$ is 1,2-dilithio-1,2-diphenylethane.

7. In the preparation of a block copolymer formed of a copolymer block and a homopolymer block by polymerizing a mixture of 1,3-butadiene and styrene with n-butyllithium, the improvement comprising effecting the polymerization at a temperature in the range of 70 to 100° F. for 6 to 20 hours and, subsequently, at a temperature in the range of 115 to 140° F. for 1 to 4 hours.

8. In the preparation of a block copolymer formed of a copolymer block and a homopolymer block by polymerizing a mixture of (1) a conjugated diene selected from the group consisting of 1,3-butadiene, isoprene, and piperylene, and (2) a vinyl-substituted aromatic hydrocarbon in which said vinyl group is attached to a nuclear carbon atom with a compound of the formula $R(Li)_x$, wherein R is a hydrocarbon radical selected from the group consisting of aliphatic, cycloaliphatic, and aromatic radicals and X is an integer from 1 to 4, inclusive, in the presence of a hydrocarbon diluent, the improvement comprising effecting the polymerization at a temperature in the range of 70 to 100° F. for 6 to 20 hours and, subsequently, at a temperature in the range of 115 to 140° F. for 1 to 4 hours.

References Cited in the file of this patent
FOREIGN PATENTS
582,947    Canada   ---------------- Sept. 8, 1959